(12) United States Patent
Park

(10) Patent No.: US 7,485,067 B2
(45) Date of Patent: Feb. 3, 2009

(54) POWER TRAIN FOR AUTOMATIC TRANSMISSION

(75) Inventor: Sung Hoon Park, Seongnam (KR)

(73) Assignee: Hyundai Motor Company, Seoul (KR)

( * ) Notice: Subject to any disclaimer, the term of this patent is extended or adjusted under 35 U.S.C. 154(b) by 409 days.

(21) Appl. No.: 11/512,656

(22) Filed: Aug. 30, 2006

(65) Prior Publication Data

US 2008/0004154 A1   Jan. 3, 2008

(30) Foreign Application Priority Data

Jun. 28, 2006  (KR) .................. 10-2006-0058907

(51) Int. Cl.
 *F16H 3/62*  (2006.01)
(52) U.S. Cl. ..................................... 475/276
(58) Field of Classification Search ........................ None
 See application file for complete search history.

(56) References Cited

U.S. PATENT DOCUMENTS

| 6,884,197 B2* | 4/2005 | Ishimaru et al. ............. 475/271 |
| 6,905,434 B2* | 6/2005 | Sugihara et al. ............. 475/276 |
| 6,935,985 B2* | 8/2005 | Ishimaru ..................... 475/296 |
| 7,037,232 B2* | 5/2006 | Ishimaru ..................... 475/275 |

* cited by examiner

*Primary Examiner*—Dirk Wright
(74) *Attorney, Agent, or Firm*—Morgan, Lewis & Bockius LLP

(57) ABSTRACT

A power train for an automatic transmission having at realizes seven forward speeds and two reverse speeds may include: a first planetary gear set, a second planetary gear set, a third planetary gear, an input shaft, an output gear, and a transmission case. Utilizing arrangements of these components as described herein, such an automatic transmission may be provided with increased durability and more compact size.

8 Claims, 4 Drawing Sheets

| shift speed | C1 | C2 | C3 | C4 | B1 | B2 | OWC1 | OWC2 |
|---|---|---|---|---|---|---|---|---|
| D1 | | | ● | | | ● | ● | |
| D2 | | ● | | | ○ | | | ● |
| D3 | | | | ● | | ● | ● | |
| D4 | | ● | ● | | | | | |
| D5 | | ● | | ● | | | | |
| D6 | ● | | | ● | | | | |
| D7 | | | ● | ● | | | | |
| REV.1 | | | ● | | ● | | | |
| REV.2 | ● | | | | ● | | | |

POWER TRAIN FOR AUTOMATIC TRANSMISSION

CROSS-REFERENCE TO RELATED APPLICATION

This application claims priority to and the benefit of Korean Patent Application No. 10-2006-0058907 filed in the Korean Intellectual Property Office on Jun. 28, 2006, the entire contents of which are incorporated herein by reference.

BACKGROUND OF THE INVENTION (a) Field of the Invention

The present invention relates to a power train for an automatic transmission. More particularly, the present invention relates to a power train for an automatic transmission that realizes seven forward speeds and two reverse speeds.

DESCRIPTION OF THE RELATED ART

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

A manual transmission that has too many speeds causes an inconvenience of excessively frequent shifting operations to a driver. Therefore, the positive features of more shift-speeds are more important for automatic transmissions because an automatic transmission automatically controls shifting operations basically without needing any manual operation.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power train for an automatic transmission having advantages of enhancing durability of the automatic transmission by reducing a speed ratio of each operational element. Embodiments of the present invention also provide a power train for an automatic transmission having further advantages of providing a compact arrangement of clutches.

An exemplary power train for an automatic transmission according to an embodiment of the present invention may include: a first planetary gear set having operational elements of a first sun gear, a first ring gear, and a first planet carrier; a second planetary gear set having operational elements of a second sun gear, a second ring gear, and a second planet carrier; a third planetary gear set having operational elements of a third sun gear, a third ring gear, and a third planet carrier; an input shaft; an output gear; and a transmission case, wherein the second planet carrier is fixedly connected to the third ring gear, the third planet carrier is fixedly connected to the second ring gear, the first sun gear is always stationary by being fixedly connected to the transmission case, the first ring gear always acts as an input element by being fixedly connected to the input shaft, at least one of the fixedly connected third planet carrier and the second ring gear always acts as an output element by being fixedly connected to the output gear, the second sun gear is variably connected to the first ring gear via a first clutch, the third sun gear is variably connected to the first planet carrier via a second clutch, the second sun gear is variably connected to the first planet carrier via a third clutch, the second planet carrier is variably connected to the first ring gear via a fourth clutch, the second planet carrier is variably connected to the transmission case via a first brake and is subjected to a stopping operation of the first brake, and the third sun gear is variably connected to the transmission case via a second brake and is subjected to a stopping operation of the second brake.

The first, second, and third planetary gear sets may be disposed in a sequence of the first planetary gear set, the second planetary gear set, and the third planetary gear set.

The first, second, third, and fourth clutches may be disposed between the first planetary gear set and the second and third planetary gear sets.

The output gear may be disposed between the first brake and the second brake.

The output gear may be disposed on an opposite side to the input shaft with reference to the first planetary gear set.

In addition, an exemplary power train for an automatic transmission according to an embodiment of the present invention may further include a first one-way clutch disposed in series with the second brake.

An exemplary power train for an automatic transmission according to an embodiment of the present invention may further include a second one-way clutch disposed in parallel with the first brake.

The third clutch, the second brake, and the first one-way clutch may be operated in a first forward speed, the second clutch and the second one-way clutch may be operated in a second forward speed, the fourth clutch, the second brake, and the first one-way clutch may be operated in a third forward speed, the second and third clutches may be operated in a fourth forward speed, the second and fourth clutches may be operated in a fifth forward speed, the first and fourth clutches may be operated in a sixth forward speed, the third and fourth clutches may be operated in a seventh forward speed, the third clutch and the first brake may be operated in a first reverse speed, and the first clutch and the first brake may be operated in a second reverse speed.

DETAILED DESCRIPTION OF THE EMBODIMENTS

Exemplary embodiments of the present invention will hereinafter be described in detail with reference to the accompanying drawings.

Figure 1:
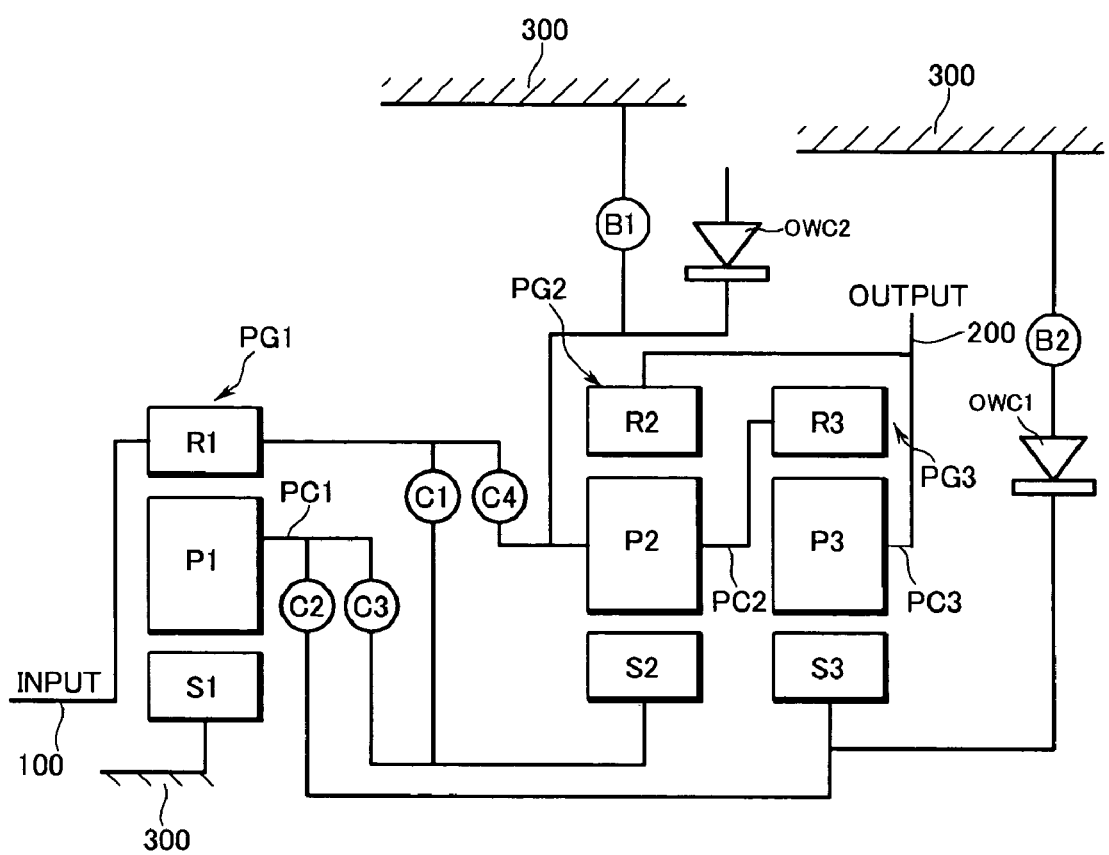
FIG. 1 is a schematic diagram of a power train for an automatic transmission according to an exemplary embodiment of the present invention.
Figure 5:
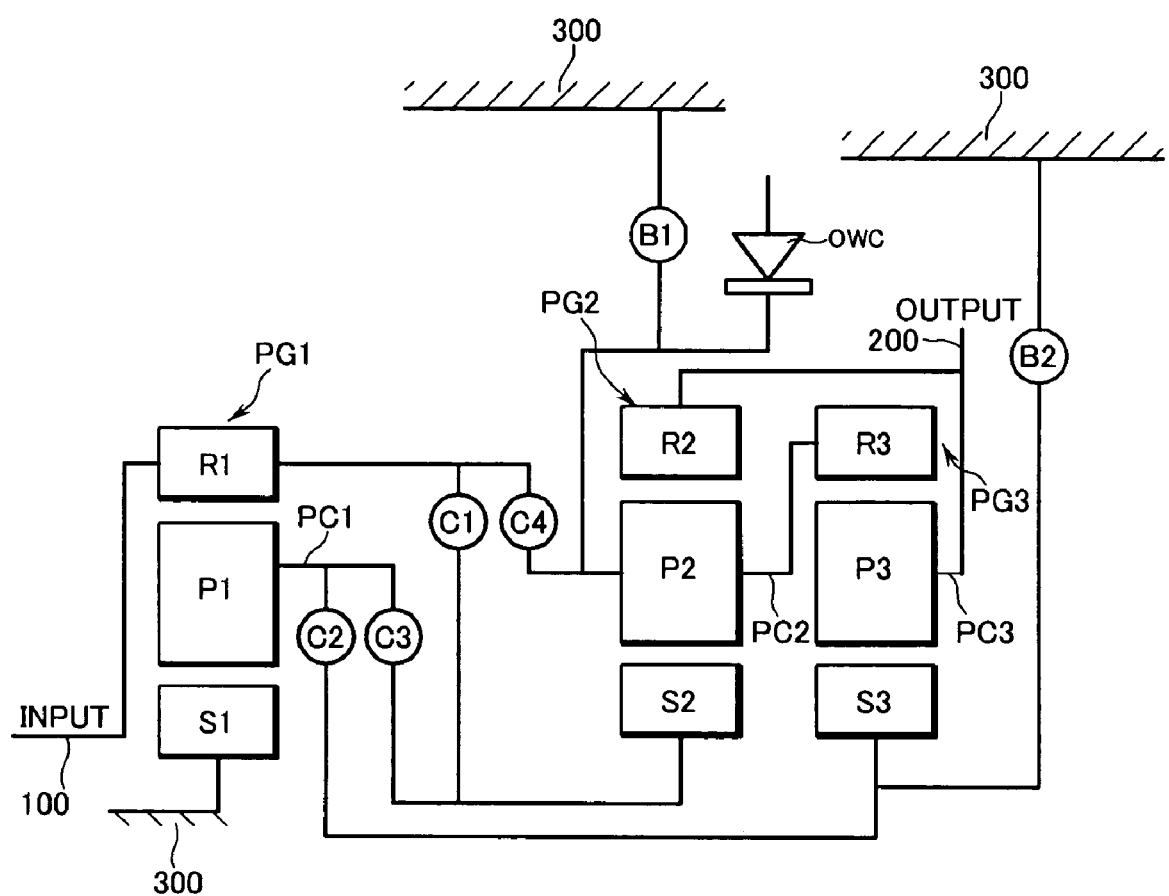
FIG. 5 is a schematic diagram of a power train for an automatic transmission according to another exemplary embodiment of the present invention.

As shown in FIG. 1 and FIG. 5, exemplary power trains for an automatic transmission according to the embodiments of the present invention include three planetary gear sets of first, second, and third planetary gear sets PG1, PG2, and PG3.

The first planetary gear set PG1 is a single pinion planetary gear set, and includes a first sun gear S1, a first planet carrier PC1, and a first ring gear R1 as operational elements thereof. A first pinion gear P1, being engaged with both the first ring gear R1 and the first sun gear S1, is connected to and carried by the first planet carrier PC1.

The second planetary gear set PG2 is a single pinion planetary gear set, and includes a second sun gear S2, a second planet carrier PC2, and a second ring gear R2 as operational elements thereof. A second pinion gear P2, being engaged with both the second ring gear R1 and the second sun gear S2, is connected to and carried by the second planet carrier PC2.

The third planetary gear set PG3 is a single pinion planetary gear set, and includes a third sun gear S3, a third planet carrier PC3, and a third ring gear R3 as operational elements thereof. A third pinion gear P3, being engaged with both the third ring gear R3 and the third sun gear S3, is connected to and carried by the third planet carrier PC3.

In addition, as shown in FIG. 1 and FIG. 5, exemplary power trains for an automatic transmission according to the embodiments of the present invention include an input shaft 100 for receiving torque from an engine (not shown), an output gear 200 for outputting torque from the power train, and a transmission case 300.

The first sun gear S1 is preferably always stationary by being fixedly connected to the transmission case 300.

The first ring gear R1 preferably always acts as an input element by being fixedly connected to the input shaft 100.

Therefore, the first planetary gear set PG1 receives torque from the input shaft 100 and may transmit the torque to the second and third planetary gear sets PG2 and PG3 with a 1:1 speed ratio through the first ring gear R1.

Alternatively, the first planetary gear set PG1 receives the torque from the input shaft 100 and may transmit the torque to the second and third planetary gear sets PG2 and PG3 with a reduced speed ratio through the first planet carrier PC1.

The second planet carrier PC2 is fixedly connected to the third ring gear R3.

The third planet carrier PC3 is fixedly connected to the second ring gear R2.

The second sun gear S2 is variably connected to the first ring gear R1 via a first clutch C1.

The third sun gear S3 is variably connected to the first planet carrier PC1 via a second clutch C2.

The second sun gear S2 is also variably connected to the first planet carrier PC1 via a third clutch C3.

The second planet carrier PC2 is variably connected to the first ring gear R1 via a fourth clutch C4.

At least one of the fixedly connected third planet carrier PC3 and the second ring gear R2 is preferably always stationary by being fixedly connected to the output gear 200.

The second planet carrier PC2 is variably connected to the transmission case 300 via a first brake B1 and is subjected to a stopping operation of the first brake B1.

The third sun gear S3 is variably connected to the transmission case 300 via a second brake B2 and is subjected to a stopping operation of the second brake B2.

In addition, as shown in FIG. 1, a first one-way clutch OWC1 may be disposed in series with the second brake B2, and may be disposed between the third sun gear S3 and the transmission case 300.

As shown in FIG. 1 and FIG. 5, a second one-way clutch OWC2 may be disposed in parallel with the first brake B1, and may be disposed between the second planet carrier PC2 and the transmission case 300.

Meanwhile, as shown in FIG. 1 and FIG. 5, the first, second, and third planetary gear sets PG1, PG2, and PG3 are disposed in a sequence of the first planetary gear set PG1, the second planetary gear set PG2, and the third planetary gear set PG3.

The first, second, third, and fourth clutches C1, C2, C3, and C4 are disposed between the first planetary gear set PG1 and the second and third planetary gear sets PG2 and PG3. In addition, the output gear 200 is disposed between the first brake B1 and the second brake B2. Therefore, a compact power train may be designed by optimizing a clutch arrangement.

The output gear 200 is disposed on an opposite side to the input shaft 100 with reference to the first planetary gear set PG1. This shows that exemplary power trains for an automatic transmission according to the embodiments of present invention are applicable to a front-engine and rear-drive (FR) type engine, it is to be understood that the scope of the present invention is not limited to the disclosed embodiments or engine type. The output gear 200 may be disposed on the same side as the input shaft 100, and this can be easily obtained by a person of an ordinary skill in the art based on the teachings herein.

Figures 2, 3:
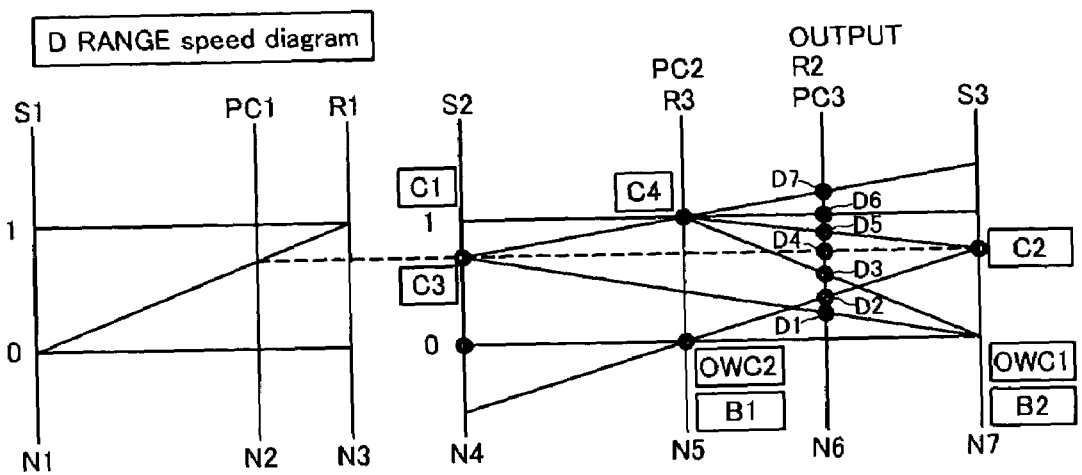
FIG. 2 is an operational chart for a power train for an automatic transmission according to an exemplary embodiment of the present invention.
FIG. 3 is a speed diagram according to a lever analysis method for showing shifting processes from a first forward speed to a seventh forward speed in a power train for an automatic transmission according to an embodiment of the present invention.

As shown in FIG. 2, according to exemplary embodiments of the present invention, brakes and clutches are operated as follows: The third clutch C3 is operated in a neutral state. The third clutch C3, the second brake B2, and the first one-way clutch OWC1 are operated in a first forward speed D1. The second clutch C2 and the second one-way clutch OWC2 are operated in a second forward speed D2. The fourth clutch C4, the second brake B2, and the first one-way clutch OWC1 are operated in a third forward speed D3. The second and third clutches C2 and C3 are operated in a fourth forward speed D4. The second and fourth clutches C2 and C4 are operated in a fifth forward speed D5. The first and fourth clutches C1 and C4 are operated in a sixth forward speed D6. The third and fourth clutches C3 and C4 are operated in a seventh forward speed D7.

In addition, according to the exemplary embodiments of the present invention, the third clutch C3 and the first brake B1 are operated in a first reverse speed REV. 1, and the first clutch C1 and the first brake B1 are operated in a second reverse speed REV. 2.

Since the second one-way clutch OWC2 is operated in the second forward speed for smooth shifting, the first brake B1 may not be operated in the second forward speed. However, both the first brake B1 and the second one-way clutch OWC2 may be operated together.

Hereinafter, shifting processes of the exemplary power trains for an automatic transmission according to the embodiments of the present invention will be described.

In a shifting process from the first forward speed D1 to the second forward speed D2, the third clutch C3 is released and the second clutch C2 is operated. In this case, the second one-way clutch OWC2 is automatically operated without an additional control.

In a shifting process from the second forward speed D2 to the third forward speed D3, the second clutch C2 is released and the fourth clutch C4 and the second brake B2 are operated. In this case, the first one-way clutch OWC1 is automatically operated without an additional control and the second brake B2 need not be controlled.

In a shifting process from the third forward speed D3 to the fourth forward speed D4, the fourth clutch C4 is released and the second and third clutches C2 and C3 are operated. In this case, the second brake B2 and the first one-way clutch OWC1 are automatically released without an additional control.

In a shifting process from the fourth forward speed D4 to the fifth forward speed D5, the third clutch C3 is released and the fourth clutch C4 is operated.

In a shifting process from the fifth forward speed D5 to the sixth forward speed D6, the second clutch C2 is released and the first clutch C1 is operated.

In a shifting process from the sixth forward speed D6 to the seventh forward speed D7, the first clutch C1 is released and the third clutch C3 is operated.

In a shifting process from the neutral state to the first reverse speed REV. 1, the first brake B1 is operated since the third clutch C3 is operated in the neutral state.

In a shifting process from the first reverse speed REV. 1 to the second reverse speed REV. 2, the third clutch C3 is released and the first clutch C1 is operated.

In a skip down shifting process from the fourth forward speed D4 to the second forward speed D2, the third clutch C3 is released. In this case, the second one-way clutch OWC2 is automatically operated.

In a skip down shifting process from the fifth forward speed D5 to the third forward speed D3, the second clutch C2 is released. In this case, the second brake B2 need not to be controlled since the first one-way clutch OWC1 is automatically operated.

In a skip down shifting process from the fifth forward speed D5 to the second forward speed D2, the second one-way clutch OWC2 is operated without an additional control when the fourth clutch C4 is released.

In a skip down shifting process from the sixth forward speed D6 to the third forward speed D3, the first clutch C1 is released and the second brake B2 is operated. In this case, the second brake B2 need not be controlled since the first one-way clutch OWC1 is automatically operated.

In addition, in a skip down shifting process from the seventh forward speed D7 to the fifth forward speed D5, the third clutch C3 is released and the second clutch C2 is operated.

Figure 4:
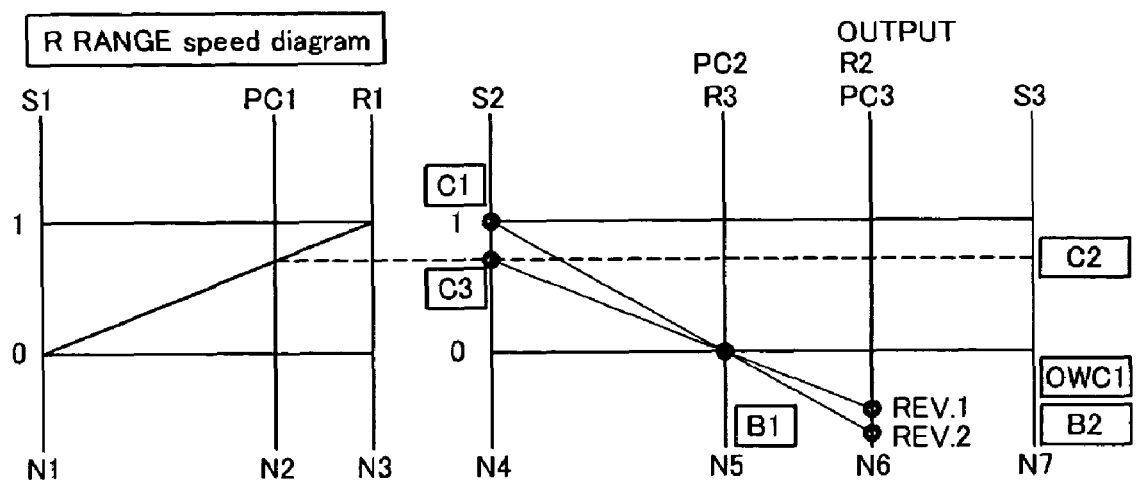
FIG. 4 is a speed diagram according to a lever analysis method for showing a shifting process from a first reverse speed to a second reverse speed in a power train for an automatic transmission according to an embodiment of the present invention.

As shown in FIG. 3 and FIG. 4, the exemplary power trains for an automatic transmission according to the embodiments of the present invention include three single pinion planetary gear sets. The second planet carrier PC2 is fixedly connected to the third ring gear R3, and the third planet carrier PC3 is fixedly connected to the second ring gear R2. Thus, operational elements of the exemplary power trains for an automatic transmission according to the embodiments of the present invention are represented as seven nodes in the lever diagram.

Accordingly, the first sun gear S1 is set to a first node N1, the first planet carrier PC1 is set to a second node N2, the first ring gear R1 is set to a third node N3, the second sun gear S2 is set to a fourth node N4, the second planet carrier PC2 and the third ring gear R3 are set to a fifth node N5, the second ring gear R2 and the third planet carrier PC3 are set to a sixth node N6, and the third sun gear S3 is set to a seventh node N7.

As described above, the first node N1 of the first sun gear S1 is always stationary by being fixedly connected to the transmission case 300, and the third node N3 of the first ring gear R1 always acts as the input element by being fixedly connected to the input shaft 100.

In addition, the second sun gear S2 is variably connected to the first ring gear R1 and the first planet carrier PC1 via the first clutch C1 and the third clutch C3, respectively. The third sun gear S3 is variably connected to the first planet carrier PC1 via the second clutch C2, and the second planet carrier PC2 is variably connected to the first ring gear R1 via the fourth clutch C4.

Therefore, a rotation speed of the engine is delivered to the fourth node N4, the fifth node N5, and the seventh node N7 with a 1:1 speed ratio or a reduced speed ratio through the input shaft 100 according to operations of the first, second, third, and fourth clutches C1, C2, C3, and C4.

In addition, the second planet carrier PC2 is variably connected to the transmission case 300 via the first brake B1. Therefore, the fifth node N5 of the second planet carrier PC2 may be stopped by an operation of the first brake B1.

In addition, the third sun gear S3 is variably connected to the transmission case 300 via the second brake B2. Therefore, the seventh node N7 of the third sun gear S3 may be stopped by an operation of the second brake B2.

Hereinafter, formation of each speed by the power trains for an automatic transmission according to the embodiments of the present invention will be described, with reference to FIG. 3 and FIG. 4.

In the first forward speed D1, the fourth node N4 rotates with a reduced rotating speed since the third clutch C3 is operated. In addition, the seventh node N7 is stationary since the first one-way clutch OWC1 is operated. Therefore, the first forward speed D1 is achieved at the sixth node N6 that is the output element.

In the second forward speed D2, the seventh node N7 rotates with the reduced rotating speed since the second clutch C2 is operated. In addition, the fifth node N5 is stationary since the second one-way clutch OWC2 is operated. Therefore, the second forward speed D2 is achieved at the sixth node N6 that is the output element.

In the third forward speed D3, the fifth node N5 rotates with the same rotating speed as the input shaft 100 since the fourth clutch C4 is operated. In addition, the seventh node N7 is stationary since the first one-way clutch OWC1 is operated. Therefore, the third forward speed D3 is achieved at the sixth node N6 that is the output element.

In the fourth forward speed D4, the fourth node N4 and the seventh node N7 rotate respectively with the reduced rotating speed since the second clutch C2 and the third clutch C3 are operated. Therefore, the fourth forward speed D4 is achieved at the sixth node N6 that is the output element.

In the fifth forward speed D5, the seventh node N7 rotates with the reduced rotating speed since the second clutch C2 is operated, and the fifth node N5 rotates with the same rotating speed as the input shaft 100 since the fourth clutch C4 is operated. Therefore, the fifth forward speed D5 is achieved at the sixth node N6 that is the output element.

In the sixth forward speed D6, the fourth node N4 and the fifth node N5 rotate respectively with the same rotating speed as the input shaft 100 since the first clutch C1 and the fourth clutch C4 are operated. Therefore, the sixth forward speed D6 is achieved at the sixth node N6 that is the output element.

In the seventh forward speed D7, the fourth node N4 rotates with the reduced speed since the third clutch C3 is operated, and the fifth node N5 rotates with the same rotating speed as the input shaft 100 since the fourth clutch C4 is operated. Therefore, the seventh forward speed D7 is achieved at the sixth node N6 that is the output element.

In the first reverse speed REV. 1, the fourth node N4 rotates with the reduced speed since the third clutch C3 is operated. In addition, the fifth node N5 is stationary since the first brake B1 is operated. Therefore, the first reverse speed REV. 1 is achieved at the sixth node N6 that is the output element.

In the second reverse speed REV. 2, the fifth node N4 rotates with the same rotating speed as the input shaft 100 since the first clutch C1 is operated. In addition, the fifth node N5 is stationary since the first brake B1 is operated. Therefore, the second reverse speed REV. 2 is achieved at the sixth node N6 that is the output element.

As described above, the speed line for each planetary gear set may be easily obtained by a person of an ordinary skill in the art based on the teachings herein.

According to exemplary embodiments of the present invention, the seven forward speeds and two reverse speeds may be realized by utilizing three planetary gear sets, four clutches, and two brakes.

In addition, a compact automatic transmission may be designed by disposing the four clutches between the first planetary gear set and the second and third planetary gear sets according to the exemplary embodiments of the present invention.

In addition, a durability of the automatic transmission may be enhanced by reducing a rotating speed of operational elements that are often used under acceleration.

While this invention has been described in connection with what is presently considered to be practical exemplary embodiments, it is to be understood that the invention is not limited to the disclosed embodiments, but, on the contrary is intended to cover various modifications and equivalent arrangements included within the spirit and scope of the appended claims.

What is claimed is:

1. A power train for an automatic transmission, comprising:
    a first planetary gear set having operational elements of a first sun gear, a first ring gear, and a first planet carrier;
    a second planetary gear set having operational elements of a second sun gear, a second ring gear, and a second planet carrier;
    a third planetary gear set having operational elements of a third sun gear, a third ring gear, and a third planet carrier;
    an input shaft;
    an output gear; and
    a transmission case,
    wherein the second planet carrier is fixedly connected to the third ring gear,
    the third planet carrier is fixedly connected to the second ring gear,
    the first sun gear is always stationary by being fixedly connected to the transmission case,
    the first ring gear always acts as an input element by being fixedly connected to the input shaft,
    at least one of the fixedly connected third planet carrier and the second ring gear always acts as an output element by being fixedly connected to the output gear,
    the second sun gear is variably connected to the first ring gear via a first clutch,
    the third sun gear is variably connected to the first planet carrier via a second clutch,
    the second sun gear is variably connected to the first planet carrier via a third clutch,
    the second planet carrier is variably connected to the first ring gear via a fourth clutch,
    the second planet carrier is variably connected to the transmission case via a first brake and is subjected to a stopping operation of the first brake, and
    the third sun gear is variably connected to the transmission case via a second brake and is subjected to a stopping operation of the second brake.

2. The power train of claim 1, wherein the first, second, and third planetary gear sets are disposed in a sequence of the first planetary gear set, the second planetary gear set, and the third planetary gear set.

3. The power train of claim 2, wherein the first, second, third, and fourth clutches are disposed between the first planetary gear set and the second and third planetary gear sets.

4. The power train of claim 3, wherein the output gear is disposed between the first brake and the second brake.

5. The power train of claim 4, wherein the output gear is disposed on an opposite side to the input shaft with reference to the first planetary gear set.

6. The power train of claim 1, further comprising a first one-way clutch disposed in series with the second brake.

7. The power train of claim 6, further comprising a second one-way clutch disposed in parallel with the first brake.

8. The power train of claim 7, wherein:
    the third clutch, the second brake, and the first one-way clutch are operated in a first forward speed;
    the second clutch and the second one-way clutch are operated in a second forward speed;
    the fourth clutch, the second brake, and the first one-way clutch are operated in a third forward speed;
    the second and third clutches are operated in a fourth forward speed;
    the second and fourth clutches are operated in a fifth forward speed;
    the first and fourth clutches are operated in a sixth forward speed;
    the third and fourth clutches are operated in a seventh forward speed;
    the third clutch and the first brake are operated in a first reverse speed; and
    the first clutch and the first brake are operated in a second reverse speed.

* * * * *